(12) United States Patent
Lemma et al.

(10) Patent No.: US 9,931,799 B2
(45) Date of Patent: Apr. 3, 2018

(54) TYRE BUILDING METHOD COMPRISING WINDING AN ELASTOMER STRIP AROUND A BUILDING DRUM

(71) Applicant: BRIDGESTONE EUROPE NV, Zaventem (BE)

(72) Inventors: Claudio Lemma, Zaventem (BE); Gianni Di Biase, Zaventem (BE)

(73) Assignee: BRIDGESTONE EUROPE NV, Zaventem (BE)

( * ) Notice: Subject to any disclaimer, the term of this patent is extended or adjusted under 35 U.S.C. 154(b) by 281 days.

(21) Appl. No.: 14/793,417

(22) Filed: Jul. 7, 2015

(65) Prior Publication Data

US 2016/0009042 A1    Jan. 14, 2016

(30) Foreign Application Priority Data

Jul. 8, 2014    (IT) .............................. RM2014A0366

(51) Int. Cl.
| | |
|---|---|
| *B32B 41/00* | (2006.01) |
| *B29D 30/30* | (2006.01) |
| *B29D 30/24* | (2006.01) |
| *B29D 30/00* | (2006.01) |
| *B29D 30/44* | (2006.01) |
| *B29D 30/70* | (2006.01) |

(52) U.S. Cl.
CPC ......... *B29D 30/30* (2013.01); *B29D 30/0016* (2013.01); *B29D 30/24* (2013.01); *B29D 30/3007* (2013.01); *B29D 30/44* (2013.01); *B29D 30/70* (2013.01); *B29D 2030/0066* (2013.01); *B29D 2030/4418* (2013.01)

(58) Field of Classification Search
CPC .... B29D 30/30; B29D 30/3007; B29D 30/44; B29D 30/70; B29D 30/24; B29D 30/0016; B29D 2030/4418; B29D 2030/0066

USPC .......................... 156/64, 350, 351, 378, 379
See application file for complete search history.

(56) References Cited

U.S. PATENT DOCUMENTS 4,052,245 A * 10/1977 Kuts .................. B29D 30/3007
156/133

FOREIGN PATENT DOCUMENTS

| EP | 0 649 730 A1 | 4/1995 |
|---|---|---|
| EP | 0 791 551 A2 | 8/1997 |
| EP | 1 447 210 A2 | 8/2004 |
| WO | 2005/009726 A2 | 2/2005 |
| WO | 2010/020398 A1 | 2/2010 |

(Continued)

OTHER PUBLICATIONS

Mar. 9, 2015 Search Report issued in Italian Application No. RM20140366.

*Primary Examiner* — Michael N Orlando
*Assistant Examiner* — Joshel Rivera
(74) *Attorney, Agent, or Firm* — Oliff PLC

(57) ABSTRACT

A tire building method comprising: feeding an elastomer strip in a feed direction towards a building drum by means of a first and a second feed conveyor arranged in succession; cyclically determining the transverse position of both sides of the elastomer strip in a centring direction perpendicular to the feed direction; calculating an average head out of center on a head portion of the elastomer strip; and moving the second feed conveyor transversely in the centring direction by an amount equal to the average head out of center, before winding the elastomer strip around the building drum.

13 Claims, 10 Drawing Sheets

(56) References Cited

FOREIGN PATENT DOCUMENTS

WO 12/139556 A1 10/2012

* cited by examiner

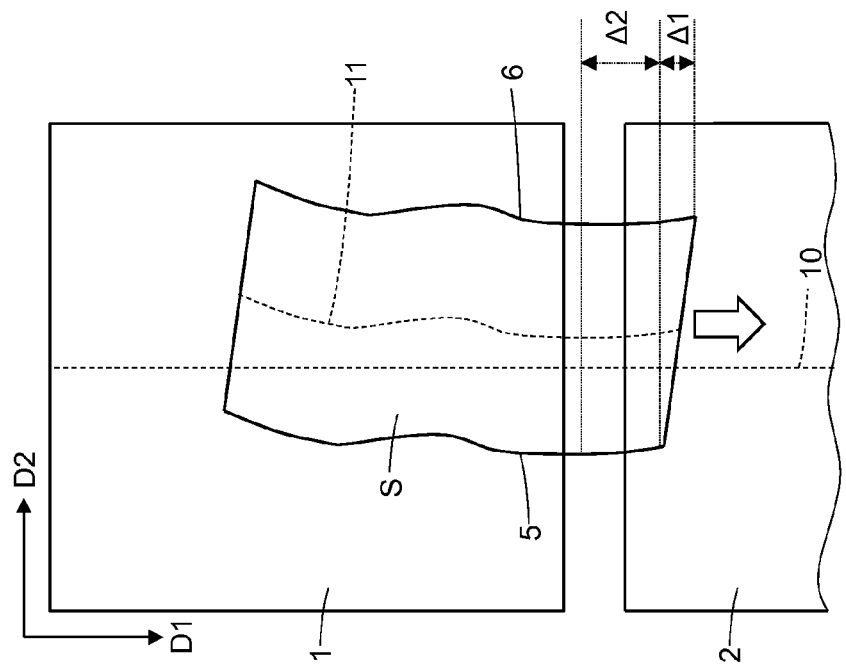
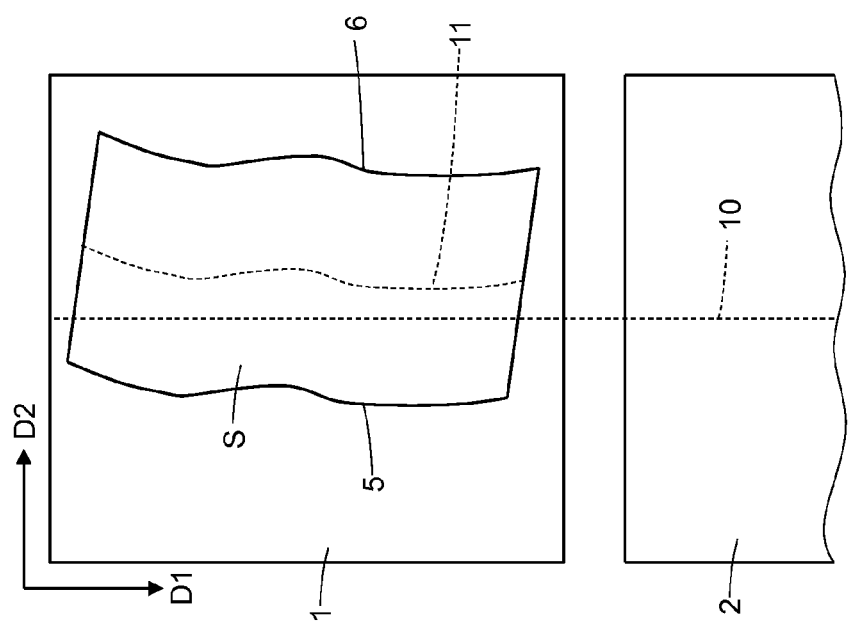

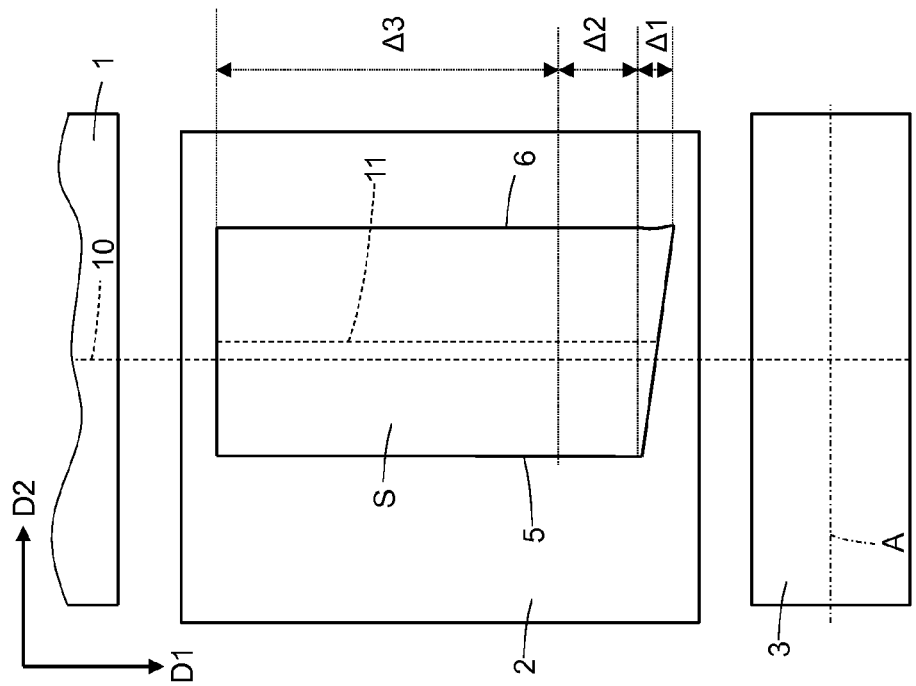
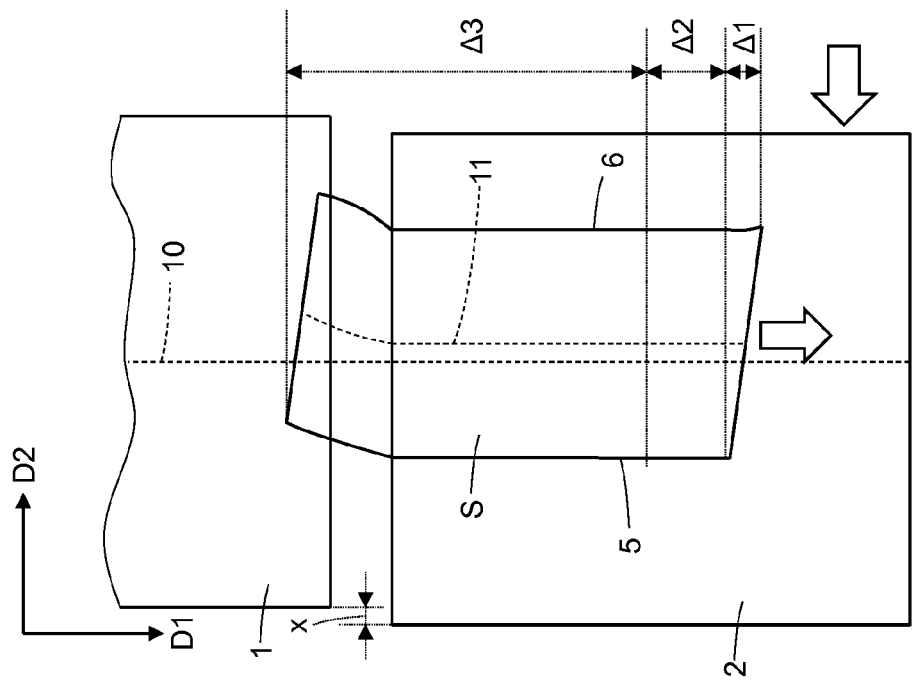

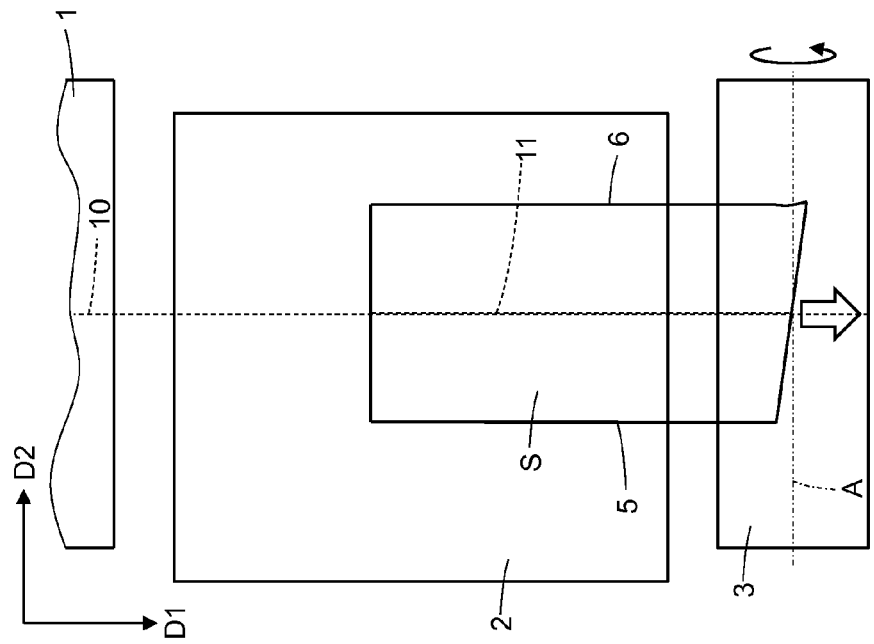
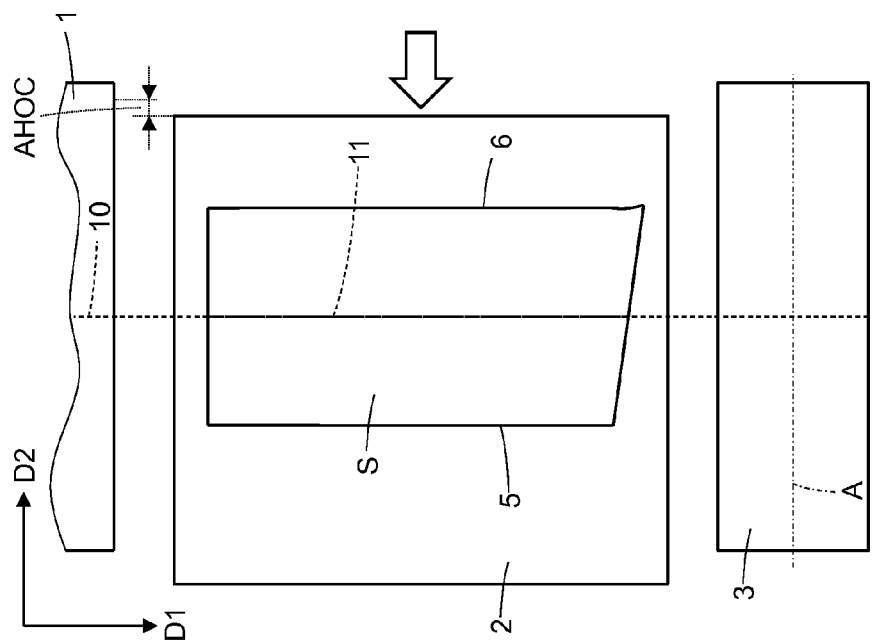

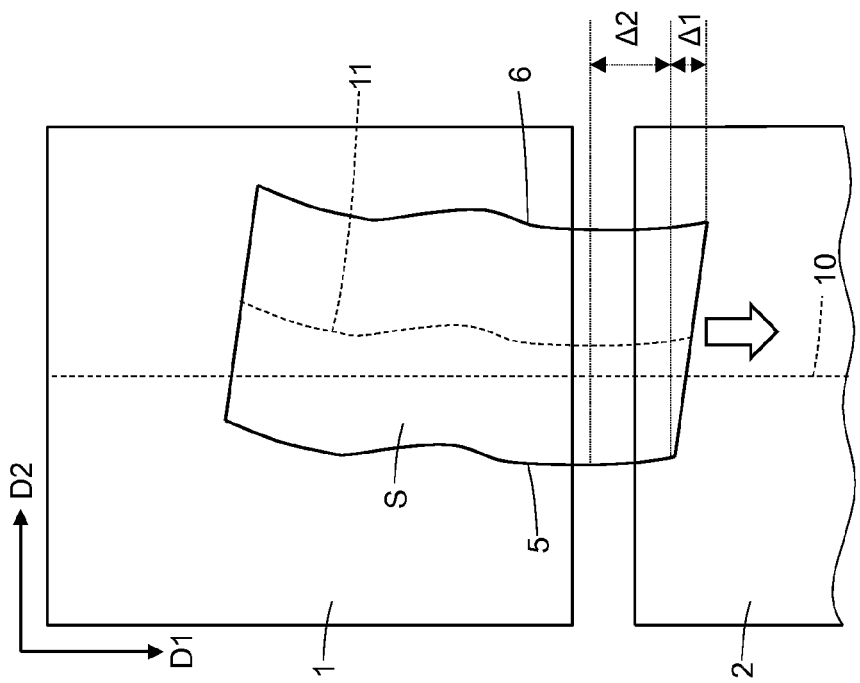
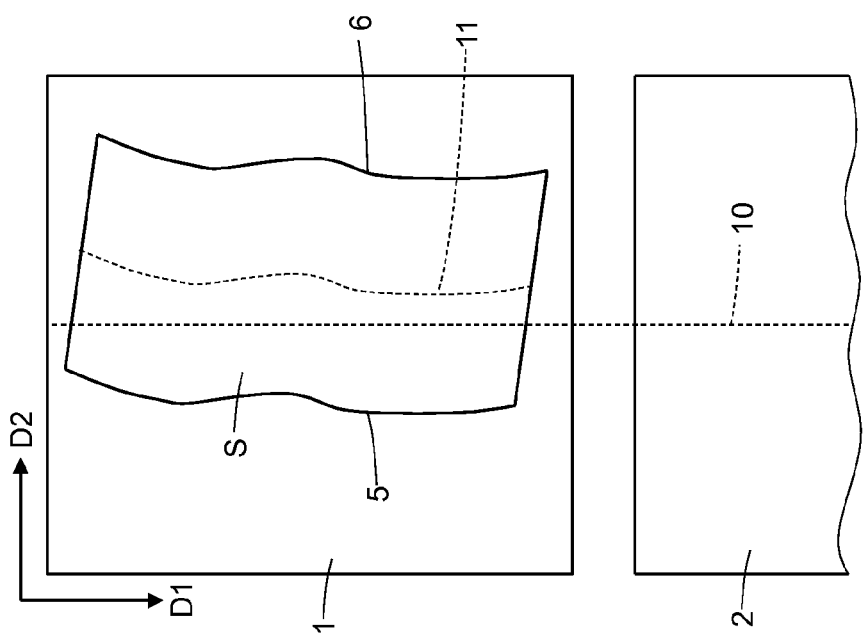

TYRE BUILDING METHOD COMPRISING WINDING AN ELASTOMER STRIP AROUND A BUILDING DRUM

TECHNICAL FIELD

The present invention relates to a tyre building method comprising winding an elastomer strip around a building drum.

PRIOR ART

Among other things, building a tyre envisages winding an elastomer strip, for example forming the innerliner, around a building drum on which the body-ply will be subsequently wound. The elastomer strip is fed to the building drum by a pair of horizontal-belt feed conveyors arranged in succession, one after the other.

Before winding the elastomer strip around the building drum it is necessary to ensure that the elastomer strip is suitable centred with respect to the building drum in order to avoid creating excessive asymmetry in the tyre (in other words, if the elastomer strip is out if alignment with respect to the building drum, the building of the tyre will be unbalanced). To centre the elastomer strip with respect to the building drum, the second feed conveyor (i.e. the feed conveyor closest to the building drum) is mounted to be transversely movable (i.e. perpendicularly to the feed direction of the elastomer strip); in this way, the second feed conveyor is moved transversely (under the control of a centring motor) when the elastomer strip is completely resting on the second feed conveyor and before winding of the elastomer strip around the building drum commences.

An optical measuring device is located between the two feed conveyors to measure the transverse position of the elastomer strip during the passage of the elastomer strip from the first feed conveyor to the second feed conveyor; in particular, the optical measuring device cyclically measures the transverse position of both sides of the elastomer strip and calculates an average misalignment AOC (Average Out of Centre) by applying the following equation:

$$AOC = \frac{1}{N} \cdot \sum_{n=1}^{N} \frac{(L_n - R_n)}{2} \quad [1]$$

AOC average out of centre;
N total number of transverse positions measured;
$L_n$ n-th transverse position of the left side of the elastomer strip;
$R_n$ n-th transverse position of the right side of the elastomer strip.

The second feed conveyor is moved transversely by operating the centring motor to perform a transverse translation equal to the average out of centre AOC, calculated as described above, to achieve the centring of the elastomer strip with respect to the building drum.

By using the above-described centring method, it is possible to obtain centring of the elastomer strip with respect to the building drum that is acceptable in the majority of cases, but which is generally never optimal and, above all, is entirely inadequate when the elastomer strip is particularly deformed (i.e. has an initial shape relatively distant from the ideal rectangular shape).

Patent applications EP0649730A1, WO2012139556A1 and EP0791551A2 describe centring methods of an elastomer strip whilst being fed to a tyre building drum.

DESCRIPTION OF INVENTION

The object of the present invention is to provide a tyre building method comprising winding an elastomer strip around a building drum, this method being devoid of the above-described drawbacks and, in particular, being simple and inexpensive to implement.

According to the present invention, a tyre building method comprising winding an elastomer strip around a building drum is provided as set forth in the appended claims.

BRIEF DESCRIPTION OF DRAWINGS

The present invention will now be described with reference to the accompanying drawings, which illustrate some non-limitative embodiments, in which:

FIGS. 8-13 schematically show the building station in FIG. 1 in plan view during successive steps of feeding an elastomer strip to the building drum and in accordance with an alternative embodiment; and FIGS. 14-19 schematically show the building station in FIG. 1 in plan view during successive steps of feeding an elastomer strip to the building drum and in accordance with a further embodiment.

PREFERRED EMBODIMENTS OF THE INVENTION

Figure 1:
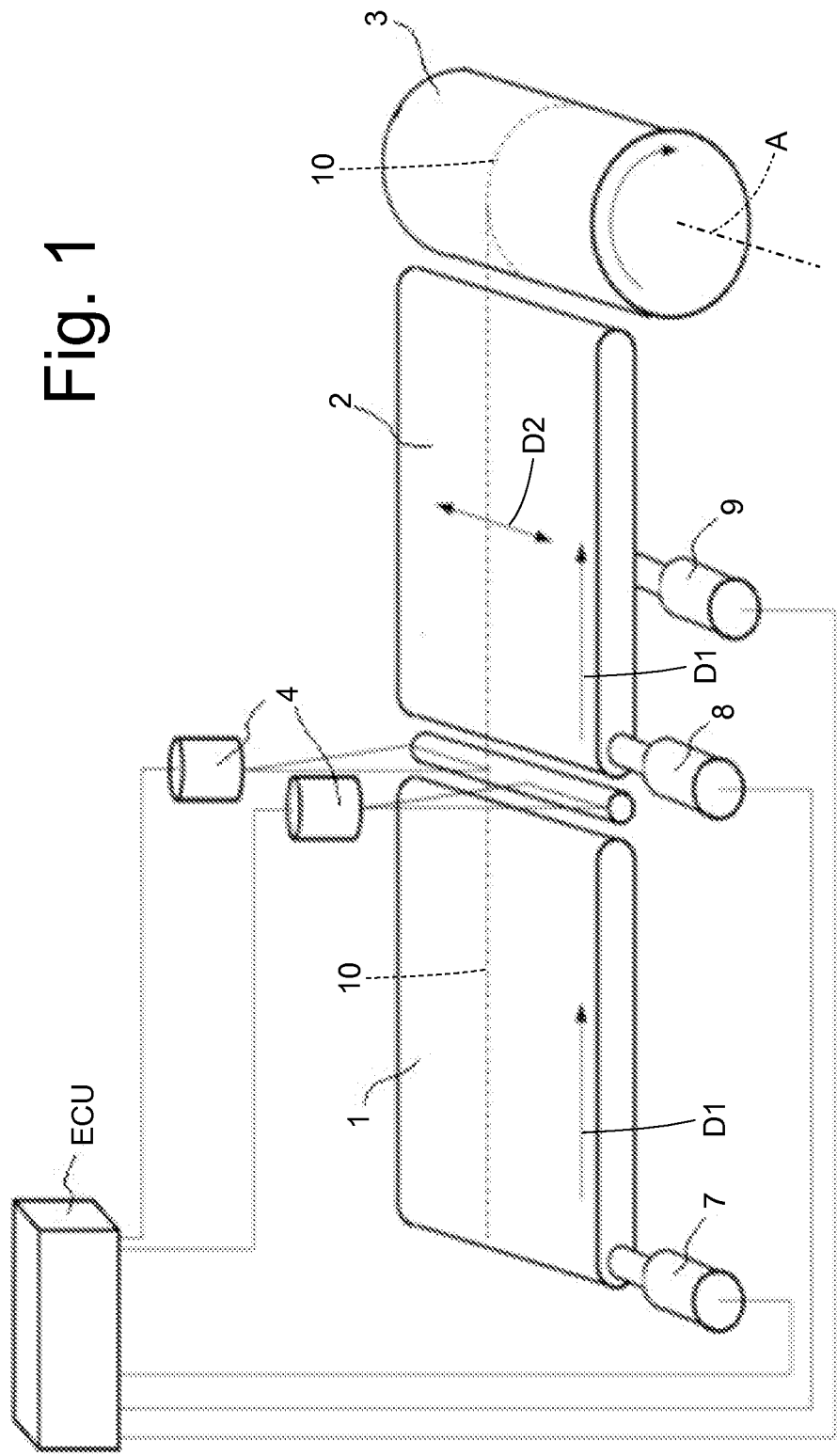
FIG. 1 shows a schematic perspective view of a tyre building station in which an elastomer strip is wound around a building drum.

FIG. 1 shows, as a whole, a tyre building station in which an elastomer strip S (for example, forming the tyre innerliner and shown in FIG. 2) is fed by two successive feed conveyors 1 and 2 to a building drum 3 for being wound around the building drum 3 (in this case, the body-ply of the tyre has previously been wound around a building drum 3). The two feed conveyors 1 and 2 are horizontally arranged belt conveyors and feed the elastomer strip S along a feed direction D1 that is horizontal and perpendicular to an axis A of rotation of the building drum 3.

The two feed conveyors 1 and 2 are slightly separated from each other and an optical measuring device 4 (of known type) is located between the two feed conveyors 1 and 2 to measure the transverse position (i.e. along a centring direction D2 perpendicular to the feed direction D1) of the elastomer strip S during the passage of the elastomer strip S from feed conveyor 1 to feed conveyor 2. In accordance with a preferred embodiment, the optical measuring device 4 cyclically measures the transverse position (i.e. in the centring direction D2) of both sides 5 and 6 of the elastomer strip S, or rather the optical measuring device 4 cyclically measures (i.e. at regular intervals) the transverse position $L_n$ of the left side 5 of the elastomer strip S and the transverse position $R_n$ of the right side 6 of the elastomer strip.

Feed conveyor 1 (located upstream of feed conveyor 2) is only movable in the feed direction D1 by means of an electric feed motor 7; in particular, the electric feed motor 7 turns a pulley of feed conveyor 1 to advance the belt of feed conveyor in the feed direction D1. Feed conveyor 2 (located downstream of feed conveyor 1 and therefore close to the building drum 3) is movable in the feed direction D1 by means of an electric feed motor 8; in particular, the electric feed motor 8 turns a pulley of feed conveyor 2 to advance the belt of feed conveyor 2 in the feed direction D1. Furthermore, feed conveyor 2 is also mounted to be movable in the centring direction D2 by means of an electric centring motor 9; in particular, feed conveyor 2 is carried on a slide that is movable along a track parallel to the centring direction D2 and the centring motor 4 controls the position of slide along the track.

An electronic control unit ECU is provided that supervises operation of the building station and is connected to the optical measuring device 4 to read the transverse positions of both sides 5 and 6 of the elastomer strip S and is connected to the three electric motors 7, 8 and 9 to control said electric motors 7, 8 and 9 (i.e. to control the movements of the feed conveyors 1 and 2).

With reference to FIGS. 2-7, a possible operating mode of the building station during the feeding and winding of an elastomer strip S around the building drum 3 is described below, with particular reference to the methods followed for centring the elastomer strip S transversely (i.e. in the centring direction D2) with respect to the building drum 3, i.e. to make the centreline 10 (or median line) of the building drum 3 coincide as far as possible with the centreline 11 (or median line) of the elastomer strip S.

Figure 2:
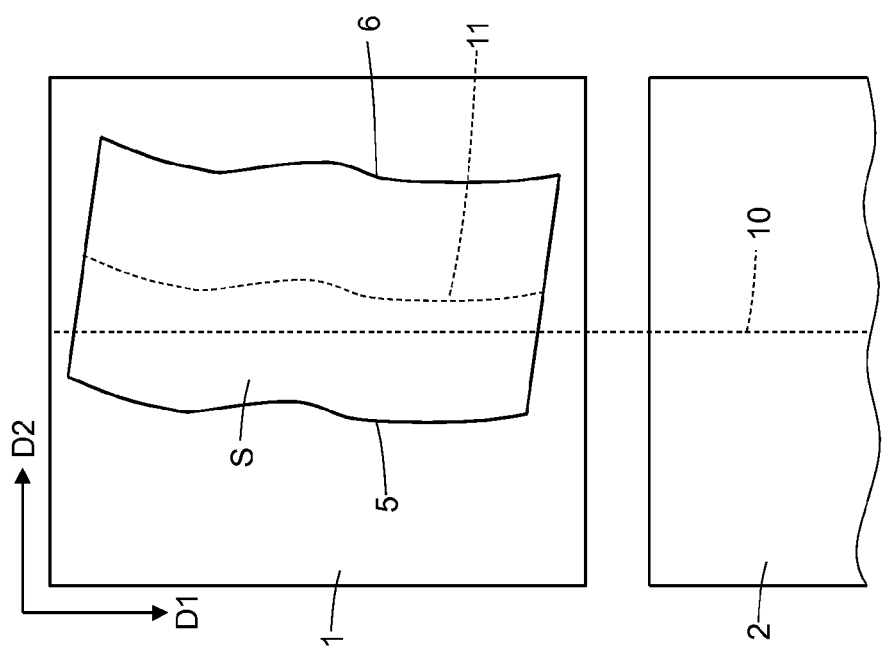

Initially, and as shown in FIG. 2, the elastomer strip S is only on feed conveyor 1 and is fed by feed conveyor 1 towards feed conveyor 2.

Figure 3:
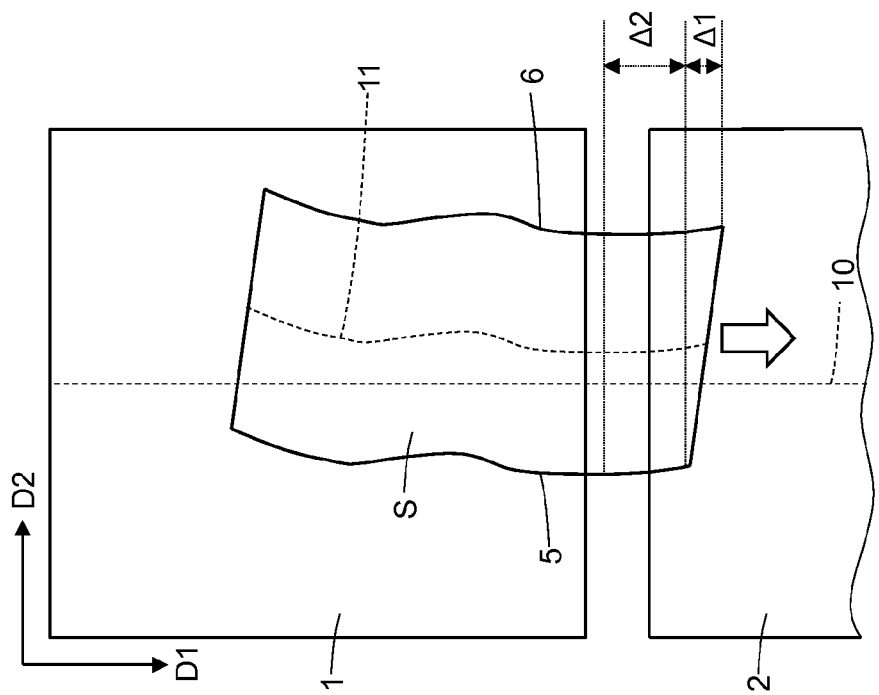
FIGS. 2-7 schematically show the building station in FIG. 1 in plan view during successive steps of feeding an elastomer strip to the building drum.

Then, and as shown in FIG. 3, the elastomer strip S progressively leaves feed conveyor 1, passing through the optical measuring device 4 to reach feed conveyor 2. As the elastomer strip S passes from feed conveyor 1 to feed conveyor 2, the optical measuring device 4 cyclically measures the transverse position in the centring direction D2 of both sides 5 and 6 of the elastomer strip S passing through the optical measuring device 4; in other words, the measuring device 4 cyclically measures the transverse position L of the left side 5 of the elastomer strip S and the transverse position R of the right side 6 of the elastomer strip S. By way of (non-limitative) example, the transverse positions L and R of the sides 5 and 6 of the elastomer strip S are calculated having the centreline 10 (or median line) of the building drum 3, which is fixed (i.e. does not make any type of transverse translation), as a reference; that is, the centreline 10 (or median line) of the building drum 3 constitutes the zero reference with respect to which the transverse positions L and R of the sides 5 and 6 of the elastomer strip S refer.

Figure 4:
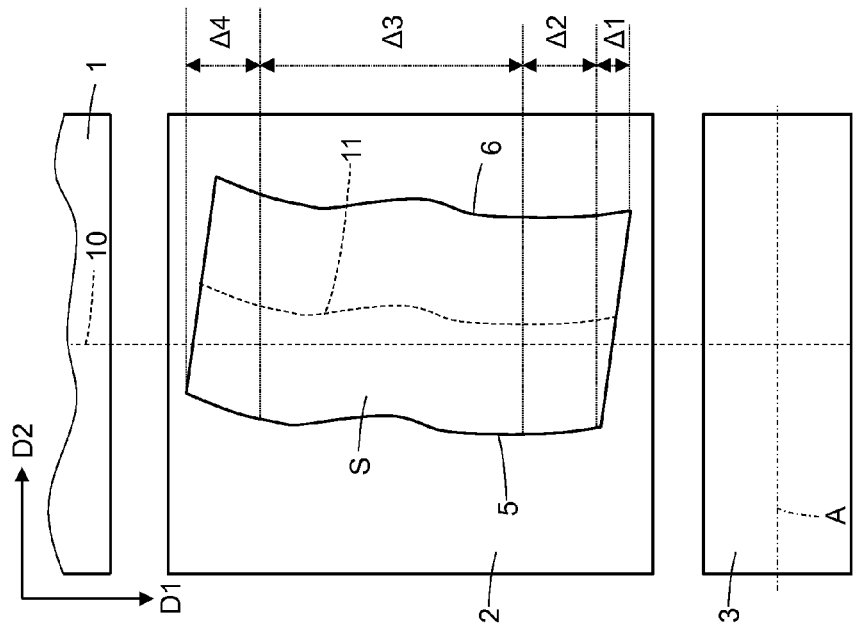
Figure 5:
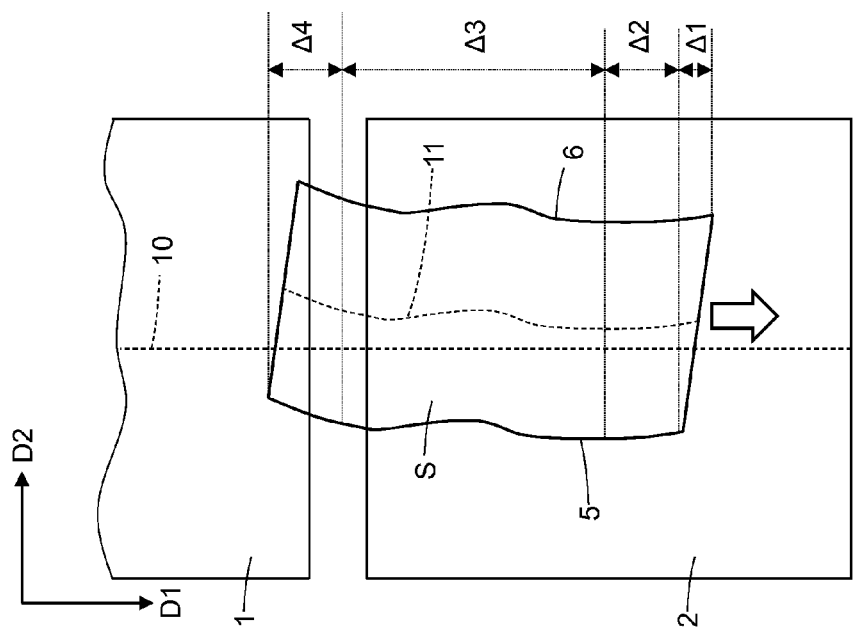

As shown in FIGS. 3, 4 and 5, the measuring device 4 cyclically measures the transverse position L of the left side 5 of the elastomer strip S and the transverse position R of the right side 6 of the elastomer strip S during the transfer of the entire elastomer strip S from feed conveyor 1 to feed conveyor 2. In other words, the measuring device 4 cyclically measures the transverse position L of the left side 5 of the elastomer strip S and the transverse position R of the right side 6 of the elastomer strip S of the entire elastomer strip S from the front end (i.e. the forwardmost point in the feed direction D1) of the elastomer strip S to the rear end (i.e. the rearmost point in the feed direction D1) of the elastomer strip S.

In accordance with a preferred embodiment shown in FIGS. 3, 4 and 5, the electronic control unit ECU ignores (i.e. does not consider) the transverse position in the centring direction D2 of both sides 5 and 6 of the elastomer strip S on a lead portion Δ1 of the elastomer strip S; in other words, the electronic control unit ECU ignores (i.e. does not consider) the lead portion Δ1 of the elastomer strip S. Various experimental studies have shown that the lead portion Δ1 of the elastomer strip S often has an irregular shape that does not allow performing effective centring and that it is consequently preferably to ignore (i.e. not consider) the lead portion Δ1. In other words, more effective centring of the elastomer strip S is achieved, on the whole, by ignoring (not considering) the lead portion Δ1 of the elastomer strip S (i.e. considering the lead portion Δ1 of the elastomer strip S has more disadvantages than advantages with regard to the centring of the elastomer strip S).

Preferably, the lead portion Δ1 of the elastomer strip S has a longitudinal dimension measured in the feed direction D1 ranging between 1 and 3 centimeters from the forwardmost point of the elastomer strip S. Alternatively, the lead portion Δ1 of the elastomer strip S could be identified by using its predetermined longitudinal dimension (for example, it could be assumed that the lead portion Δ1 of the elastomer strip S extends along the first two centimeters measured in the feed direction D1 from the forwardmost point of the elastomer strip S), or could be identified as a function of the transverse positions L and R of the sides 5 and 6 of the elastomer strip S. In this last case, it is generally assumed that the lead portion Δ1 of the elastomer strip S extends from the forwardmost point of the elastomer strip S up to the point where the sides 5 and 6 of the elastomer strip S are approximately parallel to each other.

The electronic control unit ECU identifies a head portion Δ2 of the elastomer strip S; in general, the head portion Δ2 of the elastomer strip S is identified by using its predetermined longitudinal dimension (for example, it could be assumed that the head portion Δ2 of the elastomer strip S extends along the first four centimeters measured in the feed direction D1 from the end of the lead portion Δ1 of the elastomer strip S). Preferably, the head portion Δ2 of the elastomer strip S has a longitudinal dimension measured in the feed direction D1 ranging between two and six centimeters. Once the head portion Δ2 of the elastomer strip S is identified, the electronic control unit ECU calculates an average head misalignment AHOC (Average Head Out of Centre) on a head portion Δ2 of the elastomer strip S; preferably, the electronic control unit ECU uses the following equation:

$$AHOC = \frac{1}{N} \cdot \sum_{n=1}^{N} \frac{(L_n - R_n)}{2} \qquad [2]$$

AHOC average head out of centre;

N total number of transverse positions measured on the head portion Δ2 of the elastomer strip S;

$L_n$ n-th transverse position of the left side 5 of the elastomer strip S;

$R_n$ n-th transverse position of the right side 6 of the elastomer strip S.

In addition, the electronic control unit ECU identifies an intermediate portion Δ3 of the elastomer strip S and a tail portion Δ4 of the elastomer strip S; in general, the tail portion Δ4 of the elastomer strip S is identified by using its predetermined longitudinal dimension (for example it could be assumed that the tail portion Δ4 of the elastomer strip S extends along the last four centimeters measured in the feed direction D1 from the rearmost point of the elastomer strip S). Preferably, the tail portion Δ4 of the elastomer strip S has a longitudinal dimension measured in the feed direction D1 ranging between two and six centimeters. The intermediate portion Δ3 of the elastomer strip S is simply the part of the elastomer strip S comprised between the head portion Δ2 and the tail portion Δ4. Once the tail portion Δ4 of the elastomer strip S is identified, the electronic control unit ECU calculates an average tail misalignment ATOC (Average Tail Out of Centre) on a tail portion Δ4 of the elastomer strip S; preferably, the electronic control unit ECU uses the following equation:

$$ATOC = \frac{1}{N} \cdot \sum_{n=1}^{N} \frac{(L_n - R_n)}{2} \qquad [3]$$

ATOC average tail out of centre;
N total number of transverse positions measured on the tail portion Δ4 of the elastomer strip S;
$L_n$ n-th transverse position of the left side 5 of the elastomer strip S;
$R_n$ n-th transverse position of the right side 6 of the elastomer strip S.

At this point, the electronic control unit ECU calculates a head-tail misalignment MHT (Misalignment Head Tail) as the difference between the average head out of centre AHOC and the average tail out of centre ATOC, i.e. by applying the following equation:

$$MHT = AHOC - ATOC \qquad [4]$$

Figure 6:
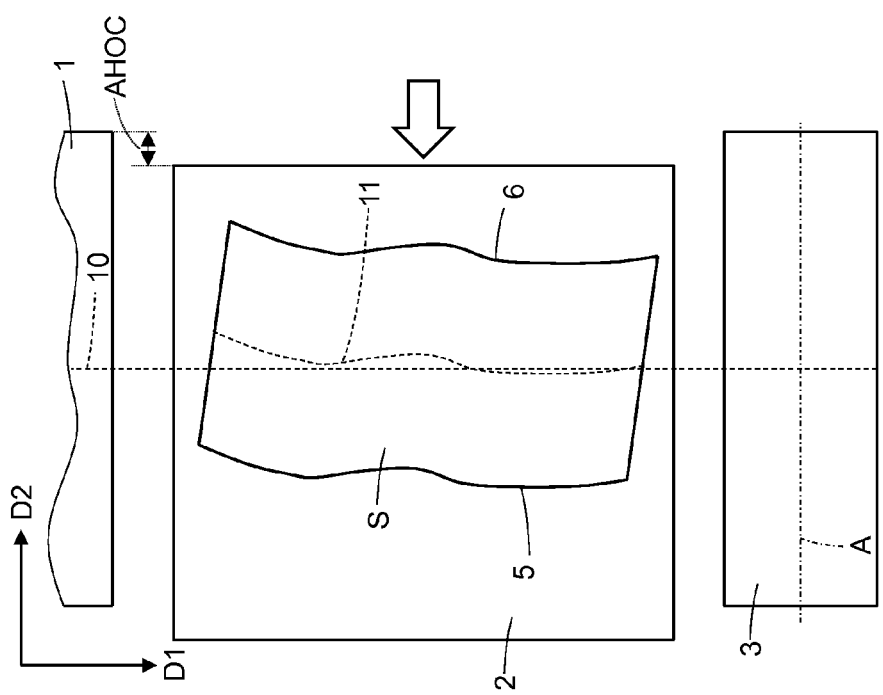

As shown in FIG. 6, when the elastomer strip S is entirely on feed conveyor 2 and before winding of the elastomer strip S around the building drum 3 commences, the electronic control unit ECU moves feed conveyor 2 transversely in the centring direction D2 by an amount equal to the average head out of centre AHOC. In other words, the electronic control unit ECU moves feed conveyor 2 (supporting all of the elastomer strip S) transversely in the centring direction D2 by an amount equal to the average head out of centre AHOC before starting to wind the elastomer strip S around the building drum 3.

Figure 7:
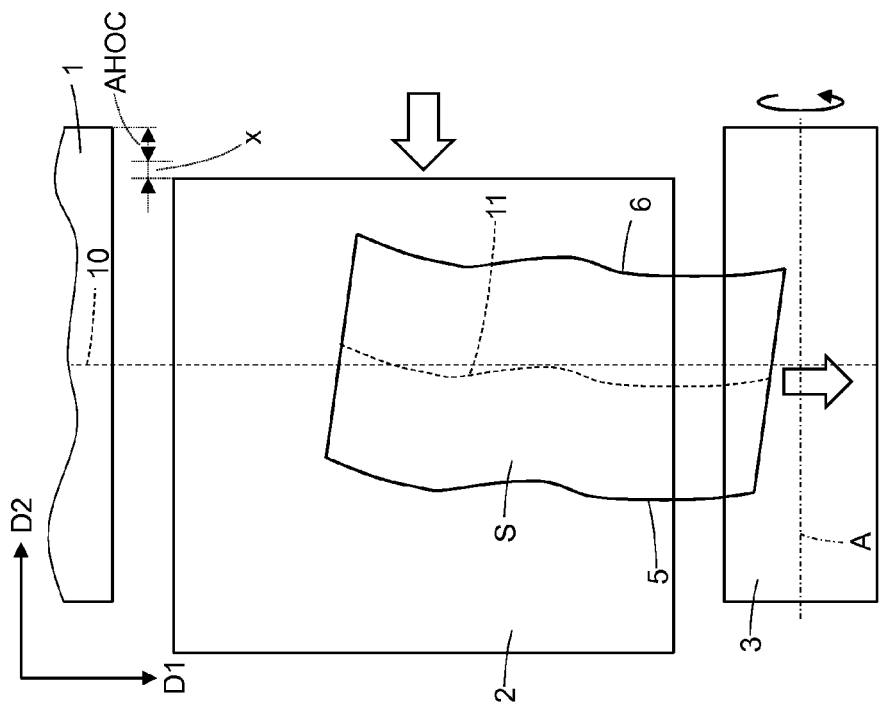

Once the above-described transverse translation of feed conveyor 2 by an amount equal to the average head out of centre AHOC has been performed, the electronic control unit ECU operates feed conveyor 2 to feed the elastomer strip S in the feed direction D1 and towards the building drum 3, to wind the elastomer strip S around the building drum 3 (as shown in FIG. 7). During the winding of the elastomer strip S around the building drum 3, the electronic control unit ECU moves feed conveyor 2 transversely in the centring direction D2, in coordination with rotation of the building drum 3, by an amount X equal to the head-tail misalignment MHT divided by 360 for each degree of rotation of the building drum 3 about its axis A of rotation, so as to distribute the head-tail misalignment MHT evenly about a complete turn of the building drum 3. In other words, for each degree of rotation of the building drum 3 about its axis A of rotation, the electronic control unit ECU moves feed conveyor 2 transversely in the centring direction D2 by an amount X equal to the head-tail misalignment MHT divided by 360; in this way, the head-tail misalignment MHT is evenly 'distributed' over a complete turn of the building drum 3. In consequence, the transverse movement X in the centring direction D2 of feed conveyor 2 during rotation of the building drum 3 about the axis A of rotation is calculated according to the following formula:

$$X(\alpha) = (MHT/360) * \alpha \qquad [5]$$

X transverse movement in centring direction D2;
MHT head-tail misalignment;
α angular position of the building drum 3.

With reference to FIGS. 8-13, an alternative operating mode of the building station during the feeding and winding of an elastomer strip S around the building drum 3 is described below, with particular reference to the methods followed for centring the elastomer strip S transversely (i.e. in the centring direction D2) with respect to the building drum 3, i.e. to make the centreline 10 (or median line) of the building drum 3 coincide as far as possible with the centreline 11 (or median line) of the elastomer strip S.

Initially, and as shown in FIG. 8, the elastomer strip S is only on feed conveyor 1 and is fed by feed conveyor 1 towards feed conveyor 2.

Then, and as shown in FIG. 9, the elastomer strip S progressively leaves feed conveyor 1, passing through the optical measuring device 4 to reach feed conveyor 2. As the elastomer strip S passes from feed conveyor 1 to feed conveyor 2, the optical measuring device 4 cyclically measures the transverse position in the centring direction D2 of both sides 5 and 6 of the elastomer strip S passing through the optical measuring device 4 (as previously described).

As shown in FIG. 9, the measuring device 4 cyclically measures the transverse position L of the left side 5 of the elastomer strip S and the transverse position R of the right side 6 of the elastomer strip S during the transfer of the head portion Δ2 of the elastomer strip S, using methods entirely identical to those previously described (also in this case, and as clearly described in the foregoing, the lead portion Δ1 of the elastomer strip S is ignored). Then, as previously described, the electronic control unit ECU calculates the average head out of centre AHOC on a head portion Δ2 of the elastomer strip S using equation [2].

Once the head portion Δ2 of the elastomer strip S has completely passed from feed conveyor 1 to feed conveyor 2, the electronic control unit ECU cyclically calculates (i.e. with a certain spatial sampling frequency) a point out of centre POC of the elastomer strip S downstream of the head portion Δ2; preferably, the following equation is used to calculate the point out of centre POC of the elastomer strip S:

$$POC = \frac{(L - R)}{2} \qquad [6]$$

POC point out of centre;
L transverse position of the left side 5 of the elastomer strip S;
R transverse position of the right side 6 of the elastomer strip S.

As shown in FIG. 10, concomitantly with the cyclic calculation of the point out of centre POC and in a manner synchronized with the cyclic calculation of the point out of centre POC, the electronic control unit ECU cyclically moves feed conveyor 2 transversely in the centring direction D2 during the transfer of the elastomer strip S from feed conveyor 1 to feed conveyor 2 by an amount X equal to the point out of centre POC, so as to compensate a certain point out of centre POC when the portion of elastomer strip S for which the point out of centre POC has been determined reaches feed conveyor 2. In other words, for each part of the elastomer strip S downstream of the head portion Δ2, the electronic control unit ECU calculates the corresponding point out of centre POC and when the part is transferred onto on feed conveyor 2, the electronic control unit ECU moves feed conveyor 2 transversely in the centring direction D2 by an amount X equal to the corresponding point out of centre POC. In consequence, the transverse movement X of feed conveyor 2 in the centring direction D2 during the transfer of the elastomer strip S from feed conveyor 1 to feed conveyor 2 is calculated according to the following formula:

$$X = POC \quad [7]$$

X transverse movement in centring direction D2;
POC point out of centre.

According to that shown in FIGS. 11 and 12, once transfer of the elastomer strip S to feed conveyor 2 is completed, i.e. when the elastomer strip S is entirely on feed conveyor 2 and before winding of the elastomer strip S around the building drum 3 commences, the electronic control unit ECU moves feed conveyor 2 transversely in the centring direction D2 by an amount equal to the average head out of centre AHOC. In other words, the electronic control unit ECU moves feed conveyor 2 (supporting all of the elastomer strip S) transversely in the centring direction D2 by an amount equal to the average head out of centre AHOC before starting to wind the elastomer strip S around the building drum 3.

Once the above-described transverse translation of feed conveyor 2 by an amount equal to the average head out of centre AHOC has been performed, the electronic control unit ECU operates feed conveyor 2 to feed the elastomer strip S in the feed direction D1 and towards the building drum 3 to wind the elastomer strip S around the building drum 3 (as shown in FIG. 13). During the winding of the elastomer strip S around the building drum 3, the electronic control unit ECU does not apply any transverse movement to feed conveyor 2 in the centring direction D2.

With reference to FIGS. 14-19, a further operating mode of the building station during the feeding and winding of an elastomer strip S around the building drum 3 is described below, with particular reference to the methods followed for centring the elastomer strip S transversely (i.e. in the centring direction D2) with respect to the building drum 3, i.e. to make the centreline 10 (or median line) of the building drum 3 coincide as far as possible with the centreline 11 (or median line) of the elastomer strip S.

Initially, and as shown in FIG. 14, the elastomer strip S is only on feed conveyor 1 and is fed by feed conveyor 1 towards feed conveyor 2.

Then, and as shown in FIG. 15, the elastomer strip S progressively leaves feed conveyor 1, passing through the optical measuring device 4 to reach feed conveyor 2. As the elastomer strip S passes from feed conveyor 1 to feed conveyor 2, the optical measuring device 4 cyclically measures the transverse position in the centring direction D2 of both sides 5 and 6 of the elastomer strip S passing through the optical measuring device 4 (as previously described).

As shown in FIG. 15, the measuring device 4 cyclically measures the transverse position L of the left side 5 of the elastomer strip S and the transverse position R of the right side 6 of the elastomer strip S during the transfer of the head portion Δ2 of the elastomer strip S, using methods entirely identical to those previously described (also in this case, and as clearly described in the foregoing, the lead portion Δ1 of the elastomer strip S is ignored). Then, as previously described, the electronic control unit ECU calculates the average head out of centre AHOC on a head portion Δ2 of the elastomer strip S using equation [2].

Once the head portion Δ2 of the elastomer strip S has completely passed from feed conveyor 1 to feed conveyor 2, the electronic control unit ECU cyclically calculates (i.e. with a certain spatial sampling frequency) the point out of centre POC of the elastomer strip S downstream of the head portion Δ2 (for example, using equation [6] as previously described).

Figure 16:
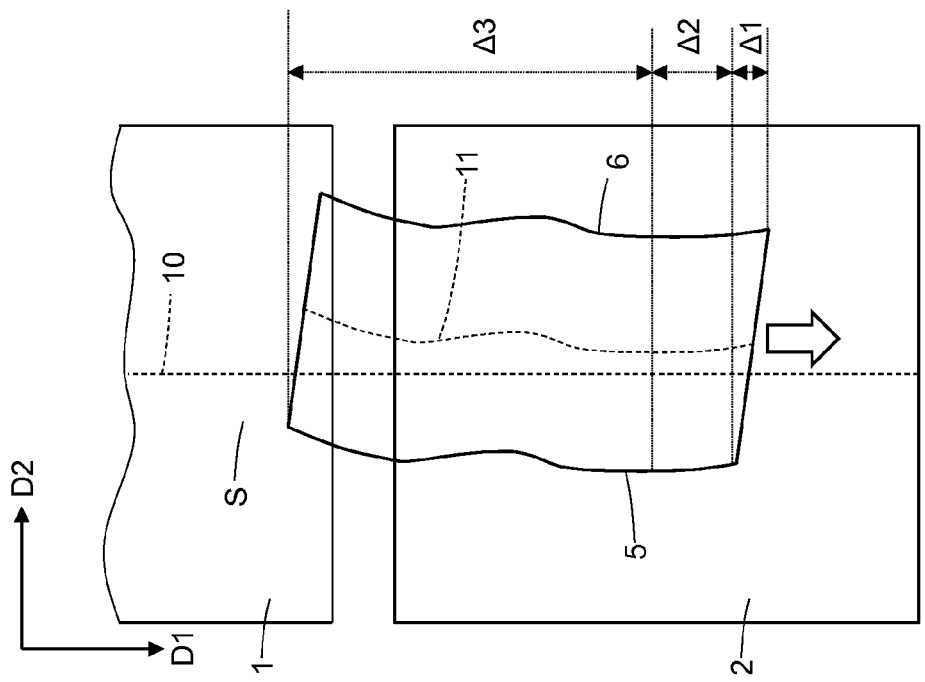

As shown in FIG. 16, concomitantly with the cyclic calculation of the point out of centre POC, the electronic control unit ECU does not perform any transverse movement of feed conveyor 2 in the centring direction D2 during the transfer of the elastomer strip S from feed conveyor 1 to feed conveyor 2; instead, the electronic control unit ECU stores the series of points out of centre POC, calculated as described above, in its memory.

Figure 17:
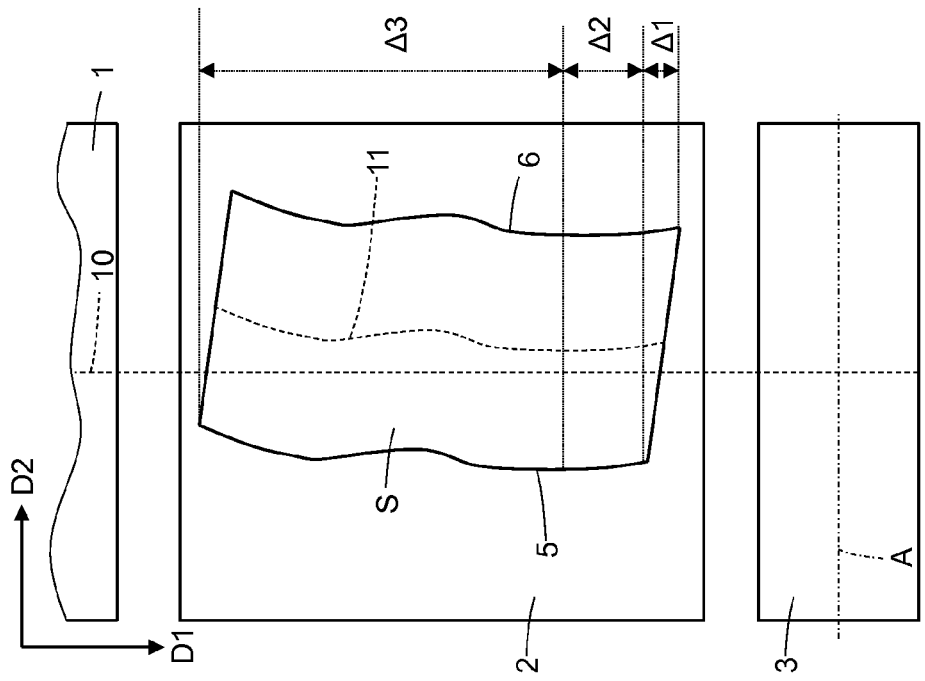
Figure 18:
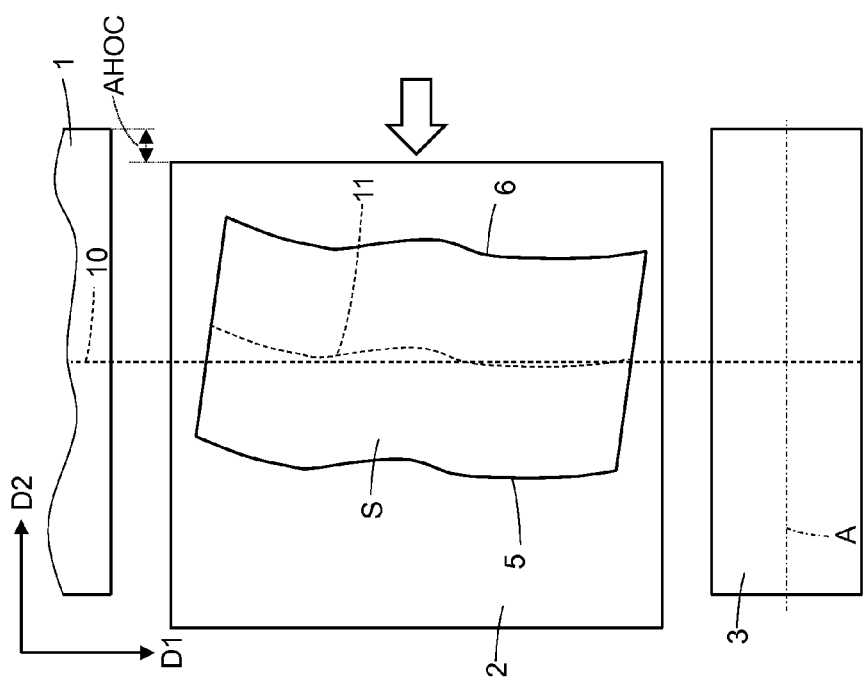

As shown in FIGS. 17 and 18, once the elastomer strip S has completely passed onto feed conveyor 2, i.e. when the elastomer strip S is entirely on feed conveyor 2 and before winding of the elastomer strip S around the building drum 3 commences, the electronic control unit ECU moves feed conveyor 2 transversely in the centring direction D2 by an amount equal to the average head out of centre AHOC. In other words, the electronic control unit ECU moves feed conveyor 2 (supporting all of the elastomer strip S) transversely in the centring direction D2 by an amount equal to the average head out of centre AHOC before starting to wind the elastomer strip S around the building drum 3.

Figure 19:
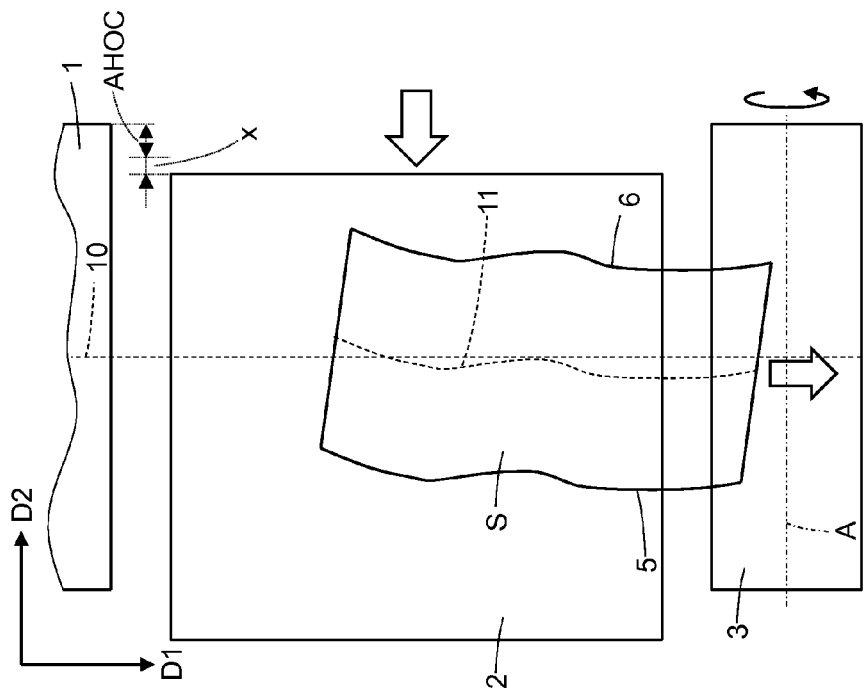

Once the above-described transverse translation of feed conveyor 2 by an amount equal to the average head out of centre AHOC has been performed, the electronic control unit ECU operates feed conveyor 2 to feed the elastomer strip S in the feed direction D1 and towards the building drum 3 to wind the elastomer strip S around the building drum 3 (as shown in FIG. 19). During the winding of the elastomer strip S around the building drum 3, the electronic control unit ECU moves feed conveyor 2 transversely in the centring direction D2, in coordination with rotation of the building drum 3, by an amount equal to the point out of centre POC, so as to compensate a certain point out of centre POC when the portion of elastomer strip S for which the point out of centre POC has been determined reaches the building drum 3. In other words, each time a part of the elastomer strip S is fed onto the building drum 3, the electronic control unit ECU moves feed conveyor 2 transversely in the centring direction D2 by an amount equal to the corresponding point out of centre POC (i.e. the point out of centre POC corresponding to the part of the elastomer strip S that is fed onto the building drum 3). In consequence, the transverse movement X of feed conveyor 2 in the centring direction D2 during the rotation of the building drum 3 about the axis A of rotation is calculated according to the following formula:

$$X(\alpha) = POC(\alpha) \quad [8]$$

point out of centre;
X transverse movement in centring direction D2;
POC point out of centre;
α angular position of the building drum 3.

To summarize, all of the above-described methods envisage feeding the elastomer strip S in the feed direction D1, towards the building drum 3, by means of the two feed conveyors 1 and 2 arranged in succession; the transverse position in the centring direction D2 of both sides 5 and 6 of the elastomer strip S is cyclically measured by means of the optical measuring device 4. In consequence, feed conveyor 2 is moved transversely in the centring direction D2 as a function of the measurements taken by the optical measuring device 4 for centring the elastomer strip S with respect to the building drum 3.

The above-described tyre building method has numerous advantages.

Firstly, the above-described tyre building method enables the centring of the elastomer strip S with respect to the building drum 3 to be sensibly improved, especially when the elastomer strip S on feed conveyor 1 is deformed (i.e. has a shape relatively distant from the ideal rectangular shape). In other words, the above-described tyre building method not only enables obtaining an 'average' centring of the elastomer strip S with respect to the building drum 3, but also enables correcting possible initial deformation of the elastomer strip S (in a more or less efficient manner).

Furthermore, the above-described tyre building method is simple and inexpensive to implement, as with respect to a known building method, it does not require any physical (i.e. 'hardware') modification, but only adapting the control software stored in the electronic control unit ECU).

The elastomer strip S that is centred as described above with respect to the building drum 3 can constitute any component of a tyre; thus, by way of (non-limitative) example, the elastomer strip S can constitute the innerliner of the tyre, the body-ply of the tyre, or a belt of the tyre.

The invention claimed is:

1. A tyre building method, the building method comprising:
    feeding an elastomer strip in a feed direction towards a building drum having a centreline, by a first and a second feed conveyor arranged in succession;
    cyclically determining, by an optical measuring device arranged upstream from the second feed conveyor, the transverse position of both sides of the elastomer strip in a centring direction perpendicular to the feed direction;
    winding the elastomer strip around the building drum;
    calculating, by an electronic control unit connected to the optical measuring device, an average head out of centre (AHOC) on a head portion of the elastomer strip; and
    piloting, by the electronic control unit, a centring motor for moving the second feed conveyor transversely in the centring direction by an amount equal to the average head out of centre (AHOC), to centre the elastomer strip with respect to the building drum before winding the elastomer strip around the building drum.

2. A building method as claimed in claim 1, wherein the average head out of centre (AHOC) on the head portion of the elastomer strip is calculated using the following equation:

$$AHOC = \frac{1}{N} \cdot \sum_{n=1}^{N} \frac{(L_n - R_n)}{2}$$

where:
AHOC is the average head out of centre;
N is a total number of transverse positions measured on the head portion of the elastomer strip (S);
$L_n$ is an n-th transverse position of the left side of the elastomer strip;
$R_n$ is an n-th transverse position of the right side of the elastomer strip.

3. A building method as claimed in claim 1, wherein the longitudinal dimension, measured in the feed direction, of the head portion of the elastomer strip ranges between 2 and 6 centimeters.

4. A building method as claimed in claim 1, further comprising ignoring the transverse position, in the centring direction, of both sides of the elastomer strip on a lead portion of the elastomer strip located ahead of the head portion in the feed direction.

5. A building method as claimed in claim 4, wherein the longitudinal dimension, measured in the feed direction, of the lead portion of the elastomer strip ranges between 1 and 3 centimeters from the forwardmost point of the elastomer strip.

6. A building method as claimed in claim 1, further comprising:
    calculating an average tail out of centre (ATOC) on a tail portion of the elastomer strip;
    calculating a head-tail misalignment (MHT) as the difference between the average head out of centre (AHOC) and average tail out of centre (ATOC); and
    moving the second feed conveyor transversely in the centring direction, when winding the elastomer strip around the building drum and in coordination with rotation of the building drum, by an amount equal to the head-tail misalignment (MHT) divided by 360 for each degree of rotation of the building drum about its axis of rotation, so as to distribute the head-tail misalignment (MHT) evenly about a complete turn of the building drum.

7. A building method as claimed in claim 6, wherein the average tail out of centre (ATOC) on the tail portion of the elastomer strip is calculated using the following equation:

$$ATOC = \frac{1}{N} \cdot \sum_{n=1}^{N} \frac{(L_n - R_n)}{2}$$

where:
ATOC is the average tail out of centre;
N is a total number of transverse positions measured on the tail portion (Δ4) of the elastomer strip (S);
$L_n$ is an n-th transverse position of the left side (5) of the elastomer strip (S);
$R_n$ is an n-th transverse position of the right side (6) of the elastomer strip (S).

8. A building method as claimed in claim 6, wherein the longitudinal dimension, measured in the feed direction, of the tail portion of the elastomer strip ranges between 2 and 6 centimeters.

9. A building method as claimed in claim 1, further comprising cyclically calculating a point out of centre (POC) of the elastomer strip downstream from the head portion.

10. A building method as claimed in claim 9, wherein the point out of centre (POC) of the elastomer strip is calculated using the following equation:

$$POC = \frac{(L - R)}{2}$$

where:
POC is the point out of centre;

L is a transverse position of the left side of the elastomer strip;

R is a transverse position of the right side of the elastomer strip.

11. A building method as claimed in claim 9, further comprising cyclically moving the second feed conveyor transversely in the centring direction, when transferring the elastomer strip from the first feed conveyor to the second feed conveyor, by an amount equal to the point out of centre (POC), so as to compensate for a given point out of centre (POC) when the portion of the elastomer strip, on which the point out of centre (POC) was determined, is transferred onto the second feed conveyor.

12. A building method as claimed in claim 9, further comprising cyclically moving the second feed conveyor transversely in the centring direction, when winding the elastomer strip around the building drum and in coordination with rotation of the building drum, by an amount equal to the point out of centre (POC), so as to compensate for a given point out of centre when the portion of the elastomer strip, on which the point out of centre (POC) was determined, is fed onto the building drum.

13. A building method as claimed in claim 1, wherein the optical measuring device is located between the two feed conveyors; and the transverse position, in the centring direction, of both sides of the elastomer strip is determined cyclically as the elastomer strip is transferred to the second feed conveyor.

* * * * *